(12) United States Patent
Hoogendoorn

(10) Patent No.: US 8,162,344 B2
(45) Date of Patent: Apr. 24, 2012

(54) OUTBOARD AXLE BEARING STRUCTURE FOR A BICYCLE OR MOTORCYCLE

(75) Inventor: Steven W. Hoogendoorn, Evergreen, CO (US)

(73) Assignee: Yeti Cycling, LLC, Golden, CO (US)

(*) Notice: Subject to any disclaimer, the term of this patent is extended or adjusted under 35 U.S.C. 154(b) by 773 days.

(21) Appl. No.: 12/167,149

(22) Filed: Jul. 2, 2008

(65) Prior Publication Data
US 2009/0008987 A1    Jan. 8, 2009

Related U.S. Application Data

(60) Provisional application No. 60/947,824, filed on Jul. 3, 2007, provisional application No. 60/947,898, filed on Jul. 3, 2007.

(51) Int. Cl.
*B62K 11/02* (2006.01)
*B62K 3/14* (2006.01)
*F16C 25/00* (2006.01)

(52) U.S. Cl. ........................ 280/284; 384/262

(58) Field of Classification Search .......... 384/262, 384/431; 301/109; 280/284, 288
See application file for complete search history.

(56) References Cited

U.S. PATENT DOCUMENTS

| | | | | |
|---|---|---|---|---|
| 472,005 | A * | 3/1892 | Vale | 280/274 |
| 2,018,973 | A | 10/1935 | Pomeroy | |
| 3,733,648 | A * | 5/1973 | Asberg et al. | 16/21 |
| 4,089,570 | A * | 5/1978 | Markfelder et al. | 384/510 |
| 4,632,415 | A * | 12/1986 | San Hai | 280/279 |
| 5,372,371 | A * | 12/1994 | Larson | 280/7.16 |
| 5,549,315 | A | 8/1996 | Ashman | |
| 7,048,292 | B2 | 5/2006 | Weagle | |
| 7,128,329 | B2 | 10/2006 | Weagle | |
| 7,837,213 | B2 * | 11/2010 | Colegrove et al. | 280/284 |
| 7,918,474 | B2 * | 4/2011 | Waxham | 280/288 |
| 2004/0036251 | A1 | 2/2004 | Baldwin | |
| 2005/0052072 | A1 | 3/2005 | Schlanger | |

(Continued)

FOREIGN PATENT DOCUMENTS

FR    2782471    2/2000

(Continued)

OTHER PUBLICATIONS

PCT International Search Report and PCT Written Opinion for corresponding PCT International Application No. PCT/US2008/069117 dated Sep. 8, 2008, 7 pages.

(Continued)

*Primary Examiner* — Joanne Silbermann
*Assistant Examiner* — Daniel Yeagley
(74) *Attorney, Agent, or Firm* — Dorsey & Whitney LLP

(57) ABSTRACT

The present disclosure describes an axle and hub structure for attaching a wheel to a bicycle or motorcycle, where the bearings for rotationally supporting the axle and hub are positioned on the frame, and the axle rotates relative to the frame. In one embodiment, a structure for attaching a wheel to one of a motorcycle or bicycle includes an axle having opposing end portions and supporting a wheel, at least one left axle support collar, at least one right axle support collar, a bearing in the left axle support collar and supporting one end portion of the axle, and a bearing in the right axle support collar and supporting an opposing end portion of the axle. The axle rotates relative to the frame.

15 Claims, 5 Drawing Sheets

U.S. PATENT DOCUMENTS

| | | |
|---|---|---|
| 2005/0067806 A1 | 3/2005 | Weagle |
| 2005/0067810 A1 | 3/2005 | Weagle |
| 2006/0119070 A1 | 6/2006 | Weagle |
| 2006/0225942 A1 | 10/2006 | Weagle |
| 2007/0024022 A1 | 2/2007 | Weagle |
| 2007/0108724 A1 | 5/2007 | Julliard et al. |
| 2008/0067772 A1* | 3/2008 | Weagle .................. 280/124.134 |

FOREIGN PATENT DOCUMENTS

| | | |
|---|---|---|
| WO | WO 87/04129 A1 | 7/1987 |

OTHER PUBLICATIONS

European Search Report, European Patent Application No. 08781315.0, 8 pages, Apr. 11, 2011.

* cited by examiner

OUTBOARD AXLE BEARING STRUCTURE FOR A BICYCLE OR MOTORCYCLE

CROSS-REFERENCES TO RELATED APPLICATIONS

This application claims under 35 U.S.C.§119(e) the benefit of, and hereby incorporates by reference as if fully disclosed herein, both U.S. Patent Application No. 60/947,824 and entitled "Outboard Axle Bearing System for a Bicycle or Motorcycle," filed Jul. 3, 2007; and U.S. Patent Application No. 60/947,898 and entitled "Single Sided Chain Stay Structure for a Bicycle," filed Jul. 3, 2007, both of which are assigned to the assignee of the current application.

FIELD OF THE INVENTION

The invention is a hub system for attaching a wheel to a bicycle or motorcycle, and more particularly a hub system where the bearing is mounted on the frame and the axle rotates relative to the frame.

BACKGROUND OF THE INVENTION

Currently, wheel hubs for bicycles have internal axle bearings. These bearings allow the wheel to rotate with respect to the axle and frame. In these current designs the axle is fixed rigidly to the frame or fork and it does not rotate respectively thereto. Hub designs, especially rear hubs, have constraints on them due to componentry that are installed on the hub; such as gear cassettes and disc rotors for disc brake assemblies. These constraints are related to, but not limited to, bearing size, axle size and load capacity.

There is needed in the art an axle and hub design wherein these design constraints are addressed.

SUMMARY OF INVENTION

The invention described herein pertains to the mounting of a wheel on a motorcycle, bicycle or other such vehicle, where the bearings for supporting the axle of the wheel are mounted to the frame as opposed to the wheel structure itself. Thus, in one aspect this invention may allow the axle to rotate relative to the frame.

In one example of the invention a structure for attaching a wheel to one of a motorcycle or bicycle is disclosed, and includes an axle having opposing end portions and supporting a wheel, at least one left axle support collar, at least one right axle support collar, a bearing in the left axle support collar and supporting one end portion of the axle, a bearing in the right axle support collar and supporting an opposing end portion of the axle, and wherein the axle rotates relative to the frame.

Further to this example, the left axle support collar includes a separate chain stay axle support collar and a separate seat stay axle support collar, the right axle support collar includes a separate chain stay axle support collar and a separate seat stay axle support collar, and at least one bearing each is positioned in the left axle support collar and the right axle support collar. And further to this example each of the right and left chain stay axle support collars receives a bearing, and each of the right and left seat stay axle support collars receives a bearing.

Alternatively, the left chain stay support collar and the left seat stay support collar together receive a bearing having a common inner race, and a separate outer race, each of said separate outer races associated with one of the left seat stay support collar and the left chain stay support collar.

Also, related to this example, the wheel includes a hub, the hub is received on the axle, and the axle and the hub rotate together. The hub may be removable from the axle.

Further to the first recited example, the wheel includes a hub having opposing ends, each of the opposing ends forming a threaded recess, the hub positioned between the left and right axle support collars, a retaining fastener received through the bearing in the right axle support collar and received in one threaded recess in the hub, a retaining fastener received through the bearing in the left axle support collar and received in the opposite and corresponding threaded recess in the hub, securing the wheel to the hub by engaging the retaining fasteners in the respective threaded recesses.

In another example of the invention, a cycle for riding on a support surface is described and includes a frame, at least one wheel for engaging a support surface, and having an axle with opposing end portions; and the opposing end portions of the axle of the at least one wheel is rotatably mounted on the frame.

According to another example of the present invention, a structure for attaching a wheel hub to one of a motorcycle or bicycle is disclosed and includes an axle having opposing end portions and supporting the hub, at least one left axle support collar, at least one right axle support collar, a bearing in the left axle support collar and supporting one end portion of the axle, a bearing in the right axle support collar and supporting an opposing end portion of the axle, and wherein the axle rotates relative to the frame.

Further non-limiting benefits and features of the invention described herein are observed by the disclosure of the detailed specification, drawings, and claims provided herein.

FIGURE DESCRIPTION

DETAILED DESCRIPTION

The invention described herein relates to the placement of the bearing(s) relative to a wheel hub for use on a bicycle or motorcycle, or other such vehicles where a wheel is rotatably connected to a fork-like structure. As described herein, reference is made to a bicycle structure for clarity purposes, but does not limit the applicability to other types of vehicles and related structures this invention may apply to.

As an introduction, in a typical hub design for connecting a wheel to a fork structure, the bearings are internal to the hub structure. In these typical designs, the axle is fixed to the frame, such as at a fork structure (which is hereby defined to include front forks and rear triangle wheel mounting and connection structures), and does not rotate relative thereto. The hub, often including the gear cassette, disc brake rotor, and spoke anchors, is received on the fixed axle, and rotates relative to the fixed axle by way of at least one bearing positioned between the hub and the fixed axle.

The instant invention encompasses a structure and associated method that allows the axle to rotate relative to the fork structure (and thus the frame) by repositioning the bearings from inside the hub and engaging the axle to being set in the forks and rotatably receiving the axle. The hub may then be integral with the axle, or may be a separate structure from the axle, but in any event may rotate in conjunction with the axle. The invention(s) encompassed herein are further described below with reference to the figures and set forth in the claims.

Figure 1:
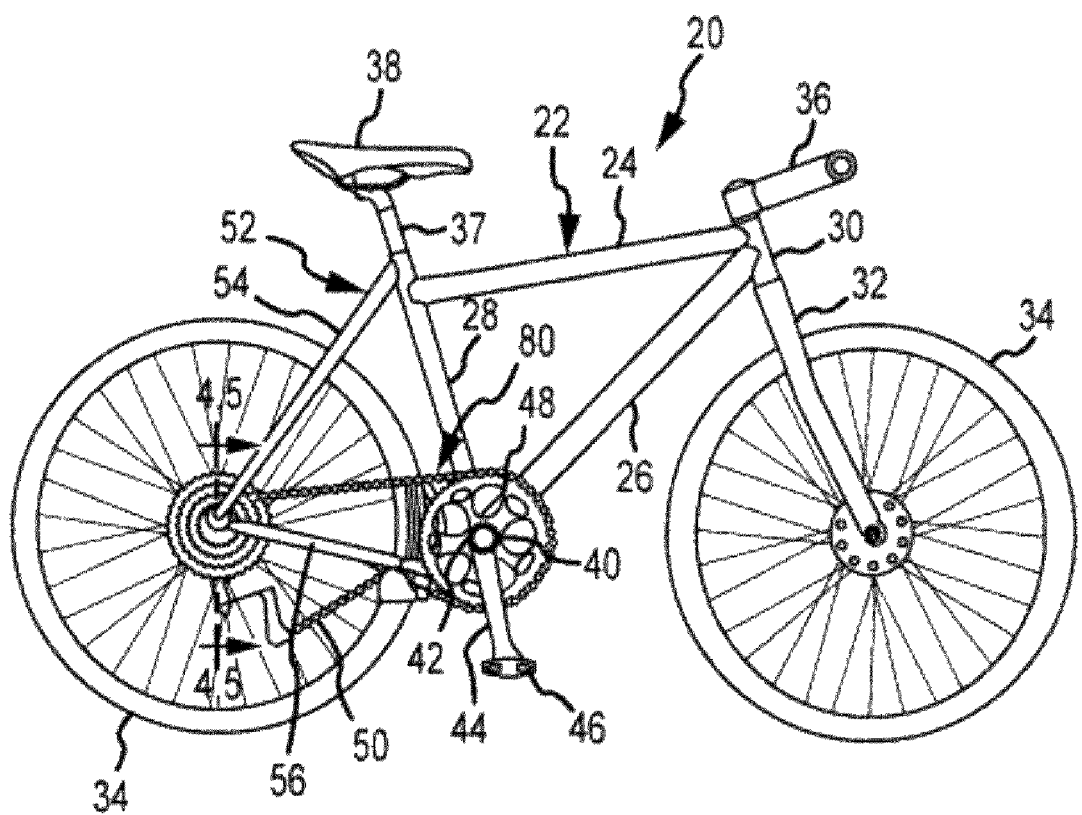
FIG. 1 shows a bicycle incorporating at least one aspect of the current invention.

FIG. 1 shows a bicycle 20 encompassing the present invention. The bicycle includes a common frame structure 22 having a top tube 24 and down tube 26 and seat tube 28. The top tube and down tube are connected at a front end to a head tube 30. The head tube supports a front fork 32, wheel 34 and handlebar 36 in movable engagement with the frame 22. The rear end of the top tube engages the top end of the seat tube 28. A seat post 37, supporting a seat 38, is adjustably inserted into the top end of the seat tube. The rear end of the down tube engages the bottom end of the seat tube at or near a bottom bracket 40. The bottom bracket rotatably supports the crank set 42. The crank set includes cranks 44 and pedals 46, and a gear ring 48 for engaging the drive chain 50. The rear triangle 52 of the bicycle frame 22 is shown in FIG. 1 as including a pair of seat stays 54 (only one shown in FIG. 1) and a pair of chain stays 56 (only one shown in FIG. 1). The seat stays 54 are attached to the top end of the seat tube 28. The chain stays 56 are attached to the bottom end of the seat tube 28 at or near the bottom bracket 40.

Figure 2:
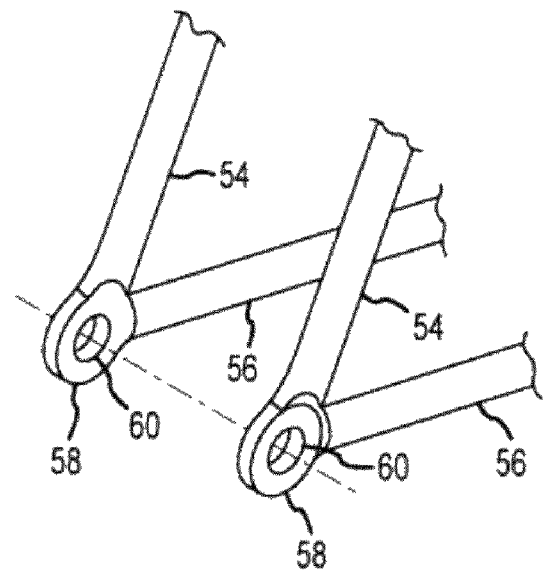
FIG. 2 shows a portion of a rear triangle where the seat stay and chain stay structures are of unitary construction.
Figure 3:
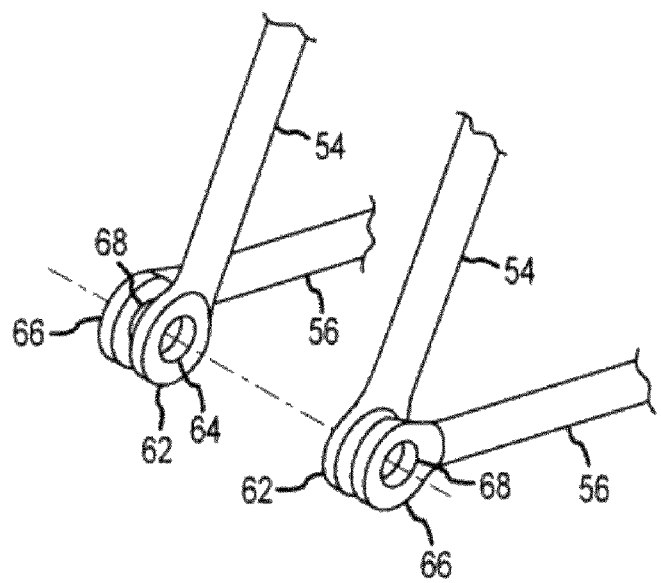
FIG. 3 shows a portion of a rear triangle where the seat stay and chain stay structures are not of unitary construction.

The rear ends of the seat stays 54 and chain stays 56 may be adapted to be a unitary structure, such as that shown in FIG. 2, or may be a non-unitary structure such as that shown in FIG. 3. These two alternatives are described in more detail below. Whether unitary or not, the rear ends of the seat stays and chain stays may support a wheel, hub, gear cassette (for engaging the drive chain), disc brake mechanism, and derailleur.

There are many different types of frame structures available for a bicycle that are able to adapt the invention herein. For instance, while a "hard tail" bicycle suspension is shown in FIG. 1, a frame having a rear suspension or a full suspension may also be applicable. Each of these different frame suspensions support an axle, wheel and hub with a chain stay and seat stay structure, where this invention would be implemented.

Further, the mechanism for attaching the seat stays and chain stays to the frame is not limiting to the implementation of this invention. The invention may also be implemented on the front fork of a bicycle, and may be implemented on rear triangle structures having one or two seat stays and only one chain stay. This invention may also be utilized on a motorcycle where only a one-sided swing arm is used.

FIG. 2 shows the rear ends of the seat stays 54 and chain stays 56 as a unitary structure. The traditional "drop-out" structure, which receives the axle and the hub and typically has a downwardly facing slot to allow the axle and hub to be removed, is in this example replaced by a axle support collar 58. Each of the rear ends of the unitary structure includes an axle support collar. The axle support collar 58 forms an aperture 60 for receiving a bearing for rotatably supporting the axle and hub structure, as is described in more detail below. The axle support collar 58 shown here completely surrounds the aperture 60, however, it is contemplated that the axle support collar 58 may only partially encompass the aperture 60 and still adequately receive the bearing to rotatably support the axle and hub structure. Further, the axle support collar 58 may be positioned other than at the intersection of the chain stay 56 and seat stay 54 on each side.

FIG. 3 shows a rear triangle where the chain stay 56 and seat stays 54 are not a unitary structure, such as that shown in FIG. 2. Each rear end of the chain stay 56 (on each side) is not connected with the corresponding rear end of the seat stay 54. This type of structure is utilized on some frames that have a rear suspension. In this example, each seat stay 54 end includes an axle support collar 62 having an aperture 64 formed therein, and each chain stay end includes an axle support collar 66 having an aperture 68 formed therein. As noted above, the collars 62, 66 may or may not fully surround the aperture 64, 68. The axle support collars 62, 66 receive a bearing (shown below) for rotatable support of an axle and hub received therein. Each collar 62, 66 may receive a bearing, or each adjacent pair of axle support collars (i.e. each pair of the seat stay and chain stay on either side) may receive a single bearing having a common inner race and a separate outer race for each stay. This is described in more detail below.

Figure 4:
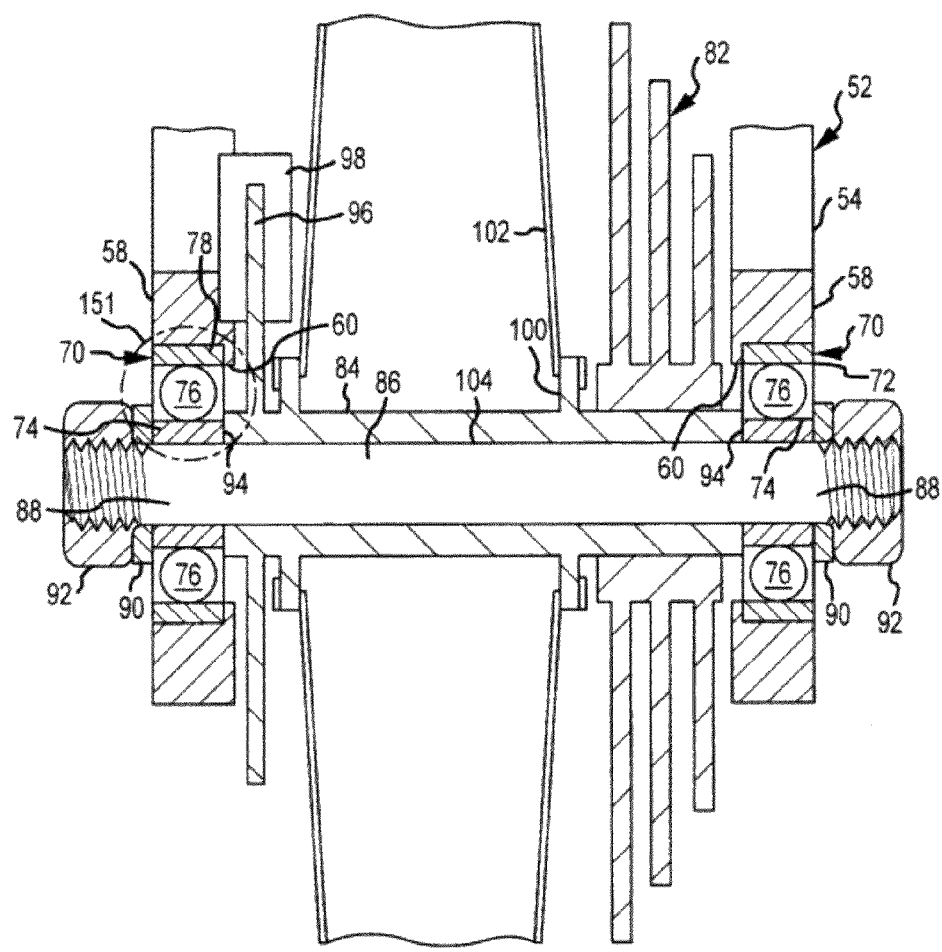
FIG. 4 is a section taken along line 4-4 of FIG. 1 where the chain stay and seat stay are of unitary construction as shown in FIG. 2.

FIG. 4 shows an example of the instant invention implemented in a bicycle frame, such as shown in FIG. 1, having a unitary rear triangle structure. The left and right (as portrayed herein) unitary seat and chain stays each have an axle support collar 58, each axle support collar defining an aperture 60. A bearing 70 is firmly seated in each aperture 60, and each bearing includes an outer race 72 and an inner race 74, with a plurality of ball bearings 76 positioned between, as is known. In its seated position, the outer race 72 of each bearing 70 engages a shoulder 78 formed on the axle support collar 58. The shoulder 78 engages the inside edge of the outer race 72 to help firmly position the bearing 70 in place. Each bearing 70, in this example, is a one-way bearing. This allows the chain drive 80 (see FIG. 1) to engage the gear cassette 82 and propel the bicycle when the user pedals in the forward direction, and for the hub 84 and axle 86 to free-wheel (rotate freely) then the user holds the pedals still or pedals relatively backwards.

An axle 86 is received through the inner race 74 on each side and extends between the bearings 70. Each end 88 of the axle extends beyond the bearing 70 on each side. Each axle end 88 has external threading for receiving a fastener, such as a washer 90 and nut 92, to fasten the axle 86 between the axle support collars 58. In this example, the washer 90 used on each end 88 of the axle 86 engages the outside edge of the bearing's inner race 74 to apply a compressive load thereto. The fastener on at least one end may be removable to allow the axle to be pulled out of the bearings. Any suitable fastener is contemplated, such as a snap ring, friction engagement, or a quick-connect. Where the axle collar 58 does not fully surround the aperture 60, and forms a slot, it may be sufficient for the fasteners to simply loosen and allow the axle to be removed through the slot. In this type of structure, the bearing 70 may need to be removed from the axle support collar 58 also.

Remaining with FIG. 4, the axle 86 is received in a hub 84, which is positioned between each of the axle support collars 58. The hub 84 snugly fits on the axle 86. Each end 94 of the hub 84 engages the inside edge of each inner race 74 to provide a surface against which the fasteners hold the bearings 70. Either end of the hub may engage an intermediate structure or structures, such as a spacer(s), which in turn engages an inside edge of the inner race 74. The hub 84 may include a brake disc rotor 96 for engagement with the caliper 98 (mounted on the seat stay or chain stay), a gear cassette 82 forming part of the drive train 80, and anchors 100 for the spokes 102. Of course the spokes 102 extend outwardly from the hub 84 to support a rim and tire, as is known. All together the hub 84 and its components form the wheel 34.

In the structure shown in FIG. 4, the axle 86 rotates relative to the frame 22 as the wheel 34 turns. The hub 84 rotates along with the axle 86. The hub 84 may be allowed to rotate relative to the axle 86 if a suitable bearing structure is positioned between the axle 86 and the hub 84, such as inside the internal hub channel 104 at either end. Also, the gear cassette 82 may be integral with the hub 84, or may be press-fit on the hub.

The gear cassette 82 may be mounted on the hub 84 with one or more one-way bearings. This would allow regular two-way bearings to be used in the axle support collars 58. Where one or more than one one-way bearing is positioned between hub 84 and the gear cassette 82, the drive chain 50 would drive the gear cassette 82 and the wheel 34 in the forward direction, and would allow free-wheeling when the user held the pedals in one position or pedaled relatively backwards.

To remove the wheel 34 from the frame 22 for replacement, maintenance, or transport, the fastener 92 may be removed from one end 88 of the axle 86. The axle 86 may then be pulled axially out of the hub 84 and the axle support collars 58. The hub 84 and wheel 34 may then "drop out" from between the axle support collars 58. The brake structure and the derailleur and chain may also need to be removed. Installation of the wheel is accomplished by positioning the hub 84 between the axle support collars 58 and in aligning the passageway 104 within the apertures 60. The axle 86 is then inserted from one end of the passageway 104 to the other, and the end fasteners 92 applied and tightened.

The structure described herein moves the bearings 70 laterally outwardly from inside the hub 84 to outside the hub 84. The advantages may include: allowing a larger diameter axle for a stronger structure and a stiffer assembly, a lighter assembly depending on the dimension and materials used, easier access and maintenance of the axle bearings, more design flexibility for wheel manufacturers, and more size options for the axle bearings.

Figure 5:
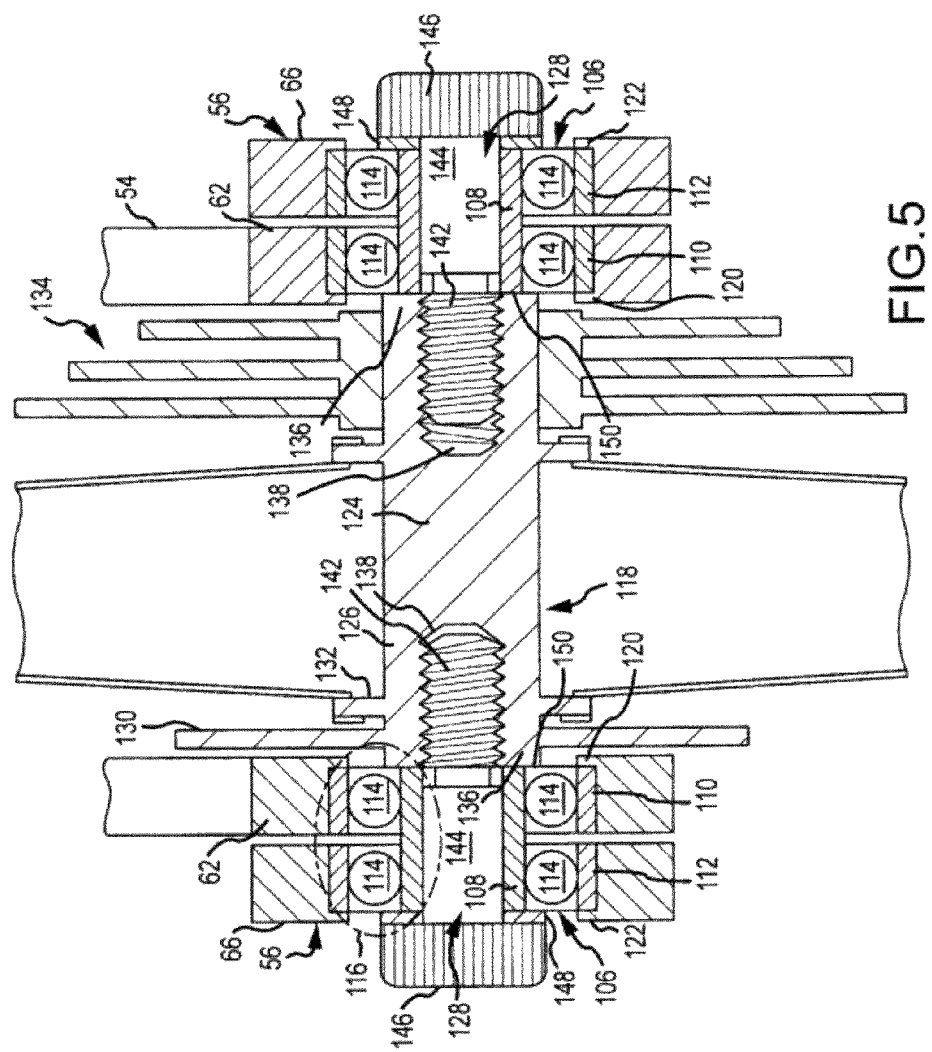
FIG. 5 is a section taken along line 5-5 of FIG. 1 where the chain stay and seat stay are of non-unitary construction.

FIG. 5 shows an example of the instant invention implemented in a bicycle frame, such as shown in FIG. 1, having a non-unitary rear triangle structure, such as that shown in FIG. 3. The left and right (as portrayed herein) non-unitary seat 54 and chain 56 stays each have an axle support collar (62, 66, respectively), each axle support collar defining an aperture (64, 68, respectively). A bearing having a common inner race 108 and separate outer races 110, 112 (and associated ball bearing members 114) is firmly seated in the commonly aligned apertures 64, 68 of the left and right paired chain 66 and seat 62 stay axle support structures. Focusing on the structure encircled by a dashed line 116 in FIG. 5 for explanation, it can be seen that the common inner race 108 is received over the axle structure 118 (described in more detail below). The inwardly of the two outer races 110 is firmly seated in the aperture 64 formed in the axle support structure 62 of the seat stay 54, and engages an inner shoulder 120 to help properly position the inwardly of the two outer races 110. The outwardly of the two outer races 112 is firmly seated in the aperture 68 formed in the axle support collar 66 of the chain stay 56, and engages an outer shoulder 122 to help property position the outer races 112. A spacer (not shown) may be positioned between the outer races 110, 112 to keep them, and their respective ball bearings 114, separated, or the structure of the outer races 110, 112 may be such that they are maintained in a spaced apart orientation even under lateral compressive forces.

Remaining with FIG. 5, the axle structure 118 in this example includes a combined axle 124, hub 126, and axle extensions 128. The combined axle 124 and hub 126 (collectively 118), similar to that as described above with respect to FIG. 4, may include a disc brake rotor 130, spoke anchors 132, and a gear cassette 134. Here, the axle 124 is integrally formed with the hub 126. Each end 136 of the hub 126 includes threaded recesses 138 for receipt of an axle extension 128. Each axle extension 128 may be both a retaining fastener and bearing surface. Each such axle extension 128 includes a threaded inner end 142 for thread engagement with the threaded recess 138. The outer portion 144 of the axle extension 128 has an outer circumferential profile sufficient to be a bearing surface received in the inner race 108 of the respective bearing 106. And the outer end 146 of each axle extension 128 has an engagement portion 146 (such as a knurled grip as shown, or nut, or alien head) for use in aiding the axle extension 128 to be threaded into the hub 126.

When assembled together, the axle extension 128 is inserted through the inner race 108 of the bearing 106 positioned in the axle support collars 62, 66 on one side. The threaded inner end 142 of the axle extension 128 is then inserted into the threaded recess 138 of the hub 126, which is positioned between the left and right ends of the rear triangle to allow alignment of the threaded recess 138 with the apertures 64, 68 formed in the left and right axle support collars 62, 66. The axle extension 128 is then threadedly received in the threaded recess 138 to cause the outer engagement portion 146 to engage (as shown here, the engagement is through a washer 148) the outside edge of the inner race 108 and create a laterally compressive force. A shoulder 150 formed at the end of the integral hub and axle 118, extending radially from the opening of the threaded recess 138, engages (itself or through another structure, such as a washer) the inside edge of the inner race 108 to help firmly seat the bearing 106, and to provide a surface against which the retaining fastener 146 creates the laterally compressive force. This same structure is found on both sides of the hub 126.

The wheel 34 is removed from the rear triangle for maintenance, replacement or transport by removing both retaining fasteners 146, in this example by unthreading them from the threaded recesses 138 and pulling the axle extensions 128 substantially out from the common inner race 108 on each side, and then removing the hub 126 from between the left and right paired axle support collars 62, 66.

This example of an implementation of the invention also may have the benefits described above with respect to the embodiment shown in FIG. 4. Additionally, this structure allows the separate seat and chain stay structures on either side of the hub to rotate independently from one another.

Each bearing 106, in this example, is a one-way bearing. Similar to that described above relating to FIG. 4, this allows the chain drive to engage the gear cassette 134 and propel the bicycle when the user pedals in the forward direction, and for the integral hub and axle 118 to free-wheel (rotate freely) then the user holds the pedals still or pedals relatively backwards.

It is contemplated that the integral axle and hub 118 may have a recess formed through the center from end to end, with the outer ends of the recesses having the threaded structures to receive the axle extensions 128.

Where the axle collars do not fully surround the aperture, and form a slot, it may be sufficient for the retaining fasteners to be simply loosened and allow the axle to be removed through the slot. In this type of structure, the bearing 106 may need to be removed from the axle support collars also. Further, in this embodiment as with that described in FIG. 4, the gear cassette 134 may be operably engaged with the hub 118 by one or more one-way bearing, thus allowing the other bearings to be two-way bearings.

The axle 86, mount 92, and hub 84 structure shown in FIG. 4 may be used in the example shown in FIG. 5 for a non-unitary rear triangle structure with separate chain stays and seat stays on either side. Likewise, the combination axle and hub 118 and axle extensions 128 shown in FIG. 5 may be used in the example shown in FIG. 4.

Figure 6:
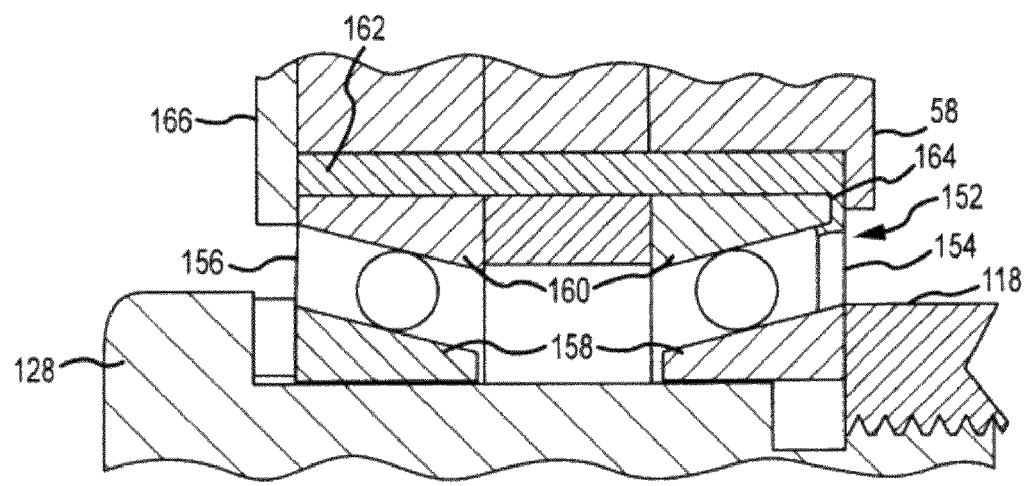
FIG. 6 is a representative cross section of a tapered bearing usable for a structure such as that shown in FIG. 4.

FIG. 6 shows an alternative angular contact bearing that may replace the bearing structures used in either FIG. 4 or FIG. 5. This angular contact bearing would work to replace the individual bearings used in FIG. 4, or it would work in FIG. 5 where each separate seat stay and chain stay has its own bearing. FIG. 6 represents the top of a single bearing, such as that shown in FIG. 4 and circled by dashed line 151. The attachment structure for the hub and axle in FIG. 6 is similar to that shown in FIG. 4. The combination axle and hub 118 and axle extensions 128 are used in this embodiment to attach to the axle support collar 58 of the unitary rear triangle of the example shown in FIG. 2. The angular contact bearing 152 is positioned in the aperture 60 to rotatably support the combination axle and hub 118 and axle extensions 128.

In this example of the bearing structure 152, the laterally inner and outer races 154, 156 are separate, and have oppositely sloped radially inner 158 and outer 160 races, which when used together may provide higher performance in a axial thrust environment. The outer races 160 are contained in a housing 162 with an inner shoulder 164 to engage the inside edge of the inner-most 154 outer 160 race. A retainer 166 on the axle support collar 58 engages the outside surface of the outer-most 156 outer 160 race. The inner-most 154 inner 158 race is contained on its inside surface by the hub 118, and the outside 156 inner 158 race is contained by the end of the axle extension/retaining fastener 128. This bearing 152 may be a one-way bearing, or a two way bearing in the alternative, as described with respect to FIG. 5. Also, the bearings may have seal caps applied to help keep dirt, water, and other penetrables out of the ball bearing structures. The bearings shown herein are schematic in nature for the purpose of explanation, and may have housing features that act as seals or covers. A suitable angular contact bearing for these purposes may include product number 432043 by the National Bearing Co. Further, it is contemplated that the bearings may be other than ball bearings, such as roller bearings, and may be replaced with bushings or the like in some circumstances.

The positioning of the axle bearing structures, as described herein, outside of the hub allow a wider engagement position for stronger and more stiff structure. It also may allow for larger diameter axles and hubs for stronger structures; and may also allow for lighter structures where the larger diameters allow for thinner material thicknesses.

Although preferred embodiments of this invention have been described above with a certain degree of particularity, those skilled in the art could make numerous alterations to the disclosed embodiments without departing from the spirit or scope of this invention as described in the specification, drawings and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, such joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A structure for attaching a wheel to one of a frame of a motorcycle or a bicycle comprising:
   an axle having opposing end portions and supporting a wheel;
   a left axle support collar, said left axle support collar including a separate chain stay axle support collar and a separate seat stay axle support collar;
   a right axle support collar;
   a bearing positioned in said left axle support collar and supporting one end portion of said axle, the bearing including:
      a common inner race configured to engage the axle;
      a first outer race associated with said left seat stay support collar and configured to rotate relative to the common inner race; and
      a second outer race associated with said left chain stay support collar and separate from the first outer race, the second outer race also configured to rotate relative to the common inner race; and
   wherein said axle rotates relative to said frame.

2. A structure as defined in claim 1, wherein:
   said right axle support collar includes a separate chain stay axle support collar and a separate seat stay axle support collar;
   and at least one bearing each is positioned in said left axle support collar and said right axle support collar.

3. A structure as defined in claim 2, wherein:
   each of said right and left chain stay axle support collars receives a bearing; and
   each of said right and left seat stay axle support collars receives a bearing.

4. A structure as defined in claim 1, wherein:
   said wheel includes a hub;
   said hub is received on said axle; and
   said axle and said hub rotate together.

5. A structure as defined in claim 4, wherein:
   said hub is removable from said axle.

6. A structure as defined in claim 1, wherein:
   said wheel includes a hub, said hub is received on said axle; and
   said axle and said hub may rotate relative to one another.

7. A structure as defined in claim 1, wherein said wheel is a front wheel.

8. A structure as defined in claim 1, wherein said wheel is a rear wheel.

9. A structure as defined in claim 1, wherein:
   said wheel includes a hub having opposing ends, each of said opposing ends forming a threaded recess, said hub positioned between said left and right axle support collars;
   a first retaining fastener received through said bearing in said right axle support collar and received in one threaded recess in said hub;
   a second retaining fastener received through said bearing in said left axle support collar and received in said opposite and corresponding threaded recess in said hub;
   securing said wheel to said hub by engaging said retaining fasteners in said respective threaded recesses.

10. A cycle for riding on a support surface, said cycle comprising:
   a frame;
   at least one wheel for engaging a support surface, and including an axle with opposing end portions;

the opposing end portions of said axle of the at least one wheel rotatably mounted on said frame;

at least one left axle support collar configured to support one of the opposing end portions of the axle, said left axle support collar including a separate chain stay axle support collar and a separate seat stay axle support collar;

at least one right axle support collar configured to support the other of the opposing end portions of the axle, said right axle support collar including a separate chain stay axle support collar and a separate seat stay axle support collar; and a bearing positioned in said left axle support collar and supporting one of the opposing end portion of said axle, the bearing including:
 a common inner race configured to engage the axle;
 a first outer race associated with said left seat stay support collar and configured to rotate relative to the common inner race; and
 a second outer race associated with said left chain stay support collar and separate from the first outer race, the second outer race also configured to rotate relative to the common inner race.

11. A cycle as defined in claim 10, wherein:
said frame includes a left axle support collar and a right axle support collar;
a bearing positioned in said right axle support collar;
a bearing positioned in said left axle support collar;
one end portion of said axle positioned in said bearing in said right axle support collar; and
the other end portion of said axle positioned in said bearing in said left axle support collar;
wherein said axle rotates in said bearings relative to said frame.

12. A structure for attaching a wheel hub to one of a frame of a motorcycle or a bicycle comprising:
an axle including opposing end portions and supporting the hub;
at least one left axle support collar including a separate chain stay axle support collar and a separate seat stay axle support collar;
at least one right axle support collar;
a bearing in said left axle support collar and supporting one end portion of said axle, the bearing including:
 a common inner race configured to engage the axle;
 a first outer race associated with said left seat stay support collar and configured to rotate relative to the common inner race; and
 a second outer race associated with said left chain stay support collar and separate from the first outer race, the second outer race also configured to rotate relative to the common inner race;
a bearing in said right axle support collar and supporting an opposing end portion of said axle; and
wherein said axle rotates relative to said frame.

13. A structure as defined in claim 12, wherein said hub includes an axis of rotation, and said bearings are positioned about said axis of rotation and laterally away from said hub.

14. A structure for attaching a wheel to one of a motorcycle or bicycle comprising:
an axle including at least one end portion and supporting a wheel;
a first axle support collar on a frame, the first axle support collar supporting said at least one end portion of said axle and including a separate chain stay axle support collar and a separate seat stay axle support collar;
a bearing in said axle support collar and supporting said at least one end portion of said axle, the bearing including:
 a common inner race configured to engage the axle;
 a first outer race associated with said seat stay support collar and configured to rotate relative to the common inner race; and
 a second outer race associated with said chain stay support collar and separate from the first outer race, the second outer race also configured to rotate relative to the common inner race; and
wherein said axle rotates relative to said frame.

15. The structure of claim 14, further comprising a first rolling-element bearing that rides on the first inner race and the first outer race and a second rolling-element bearing that rides on the first inner race and the second outer race.

* * * * *